Patented Jan. 27, 1942

2,271,259

UNITED STATES PATENT OFFICE 2,271,259

PROCESS FOR SYNTHESIZING HYDRO-
CARBONS

Wilhelm Herbert, Frankfort-on-the-Main, Germany, assignor to American Lurgi Corporation, New York, N. Y., a corporation of New York No Drawing. Application May 25, 1938, Serial No. 210,073. In Germany January 20, 1937

18 Claims. (Cl. 260—449)

This invention relates to a process for synthesizing hydrocarbons.

In the catalytic conversion of gaseous mixtures containing oxides of carbon and hydrogen into hydrocarbon compounds (particularly those of a paraffinic and olefinic nature), at temperatures below the actual temperatures of methane formation, i. e. below 270 to 300° C. and in particular below 220° C. the process is usually carried out with contact masses consisting of a metal having a hydrogenating action, such as cobalt, nickel, iron, copper, or also mixtures or alloys of these metals, combined with activators of non-metallic nature, for example thorium oxide, magnesium oxide, manganese oxide, uranium oxide and the like. As a rule, the contact materials are deposited on carrier substances, such as kieselguhr, silica gel, active carbon. The contact materials are generally produced by precipitating nitrate, chloride or formate solutions of the said metals or mixtures of metals, for example cobalt nitrate plus thorium nitrate, with alkalis, for example an alkali metal carbonate, ammonia or the like, and thereupon—or else during or before the precipitation—uniting the same with the carrier substance.

A highly active contact material is prepared, for example, by boiling up cobalt and thorium nitrate solutions with purified kieselguhr and then precipitating the metals with potassium carbonate, in the heat, until the heavy metal ions disappear. The precipitate is subjected to washing with hot water, drying, granulation and reduction with hydrogen at 300° to 400° C. A known advantageous composition comprises 33% of cobalt, 6% of thorium oxide and 61% of kieselguhr. Especially the known catalysts for the synthesis of benzine oil and paraffin at atmospheric pressure by reduction of carbon monoxide are suitable for the process of the present invention (see the publications of Franz Fischer and collaborators in "Brennstoffchemie," years 1930, 1931, 1932 onwards).

When using such catalysts for the benzine synthesis at atmospheric pressure it has been found convenient to work with gas throughputs of at most 1 normal litre per gram of hydrogenating metal (e. g. cobalt) per hour.

In general an ordinary synthesis gas, consists of: 28% of carbon monoxide, 56% of hydrogen, 14% of inert substances (nitrogen, carbon dioxide, methane) and the conversion of the CO plus $2H_2$ in the synthesis gas in one or more reaction stages amounts to 50 to 99%.

The poured weight (i. e. the weight of a litre of loosely poured contact mass) of the catalysts suitable for the benzine synthesis, for example of the aforesaid cobalt catalyst, amounts to about 300 grams per litre. The quantity of metal, in the example mentioned, amounts to 33% of 300 grams, i. e. 100 grams of cobalt per litre of poured contact mass. The throughput of gas for one litre of contact mass (which is accommodated in the usual manner in a thin layer in contact furnaces with numerous cooling elements and utilised at about 180 to 200° C.) amounts thus to 100 normal litres of synthesis gas per hour.

The time of stay of the gas, referred to the furnace space taken up by the contact material (which is thus equal to the poured volume of the contact material), amounts to one one-hundredth part of an hour, or 36 seconds. (For the purpose of simplifying the calculation, the increase of velocity of the gas owing to the volume of the contact grains and to the rise in temperature of the gas entering the furnace, and also the alteration of the volume of the gas by the contraction resulting from the reaction in the contact furnace, have not been taken into account.) Under these indicated conditions, the aforesaid contact mass works with the highest yield and longest life hitherto possible.

For example, the yield of liquid products per normal cubic metre of the aforesaid synthesis gas amounts to from 100 to 110 grams (referred to 100% synthesis gas the yields given must be multiplied by the factor 100/84). If the synthesis gas is well precleaned, i. e. freed from hydrogen sulphide, organic sulphur, resin formers and the like—the life of the contact mass is 3 to 4 months. It is assumed here that the synthesis is carried out under approximately atmospheric pressure.

Attempts have already been made to raise the efficiency of the contact materials by increasing the gas throughput above 1 litre per gram of cobalt (generally speaking, metal having a hydrogenating action), but this resulted in a lower yield and, more particularly, in a shorter life of the contact material. For this reason even smaller gas throughputs than 1 normal litre per gram of cobalt per hour are employed as a rule, for example 0.7 normal litre per gram of cobalt per hour, in the contact furnace group. Even if elevated pressure is employed in place of the usual normal pressure synthesis, a smaller yield was hitherto obtained, when increasing the gas throughput above one normal litre per gram of hydrogenating metal in the contact mass per hour, as compared with the results when working at the rate of 1 litre per gram of hydrogenating metal.

The present invention aims at increasing the efficiency of the aforesaid synthesis by maintaining the gas throughput higher than 1 normal litre, preferably 2 to 20 normal litres or more per hour per gram of hydrogenating metal in the contact mass, and by constructing the reaction chamber over which the contact mass is distributed of such large dimensions and/or by making the pressure so high that the time of stay of the gas in the contact chamber becomes greater than 45 seconds, for example 1 to 10 minutes, whilst the reaction temperature is so regulated that the evolution of heat of the reaction, calculated as heat load per square metre of cooling surface of the cooling members embedded in the contact mass, at the reaction gas pressure of $p$ atmospheres, does not exceed the value of 500 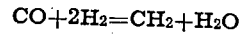 kilogram calories per hour It is easily possible to ascertain the optimum temperature by first adjusting the gas throughput and time of stay of the gas, and then progressively increasing the temperature, for example from 150° C. upwards, and holding it at that value at which the optimum yield of the desired liquid hydrocarbons occurs. This optimum temperature is lower than the temperature at which the reaction heat to be carried off by one square metre of the cooling elements attains the value of 500 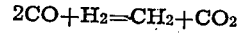 kilogram calories per hour As a rule the alteration of the time of stay and gas throughput, in accordance with the present invention, also requires a slight alteration of the temperature, as is apparent from the examples.

As a stricter rule, within the ambit of the invention, it is advisable to keep the ratio between the time of stay in minutes and the gas throughput (expressed in normal litres per gram of hydrogenating metal per hour) higher than 1:1 and, in particular, at from 3:1 to 10:1, for example.

The process may be carried into practical effect in various ways, which are described in greater detail in the examples. For example, when working at atmospheric pressure the gas throughput through a contact furnace may be doubled, while using the same amounts of contact material, if the volume of the contact furnace and the cooling surfaces of the contact furnace carrying off heat are increased to twice or three times their former magnitude, and the contact mass is accordingly spread out by the insertion therein of wire spirals, Raschig rings, and the like. This measure, however, can be employed only up to a five-fold enlargement of the volume of the contact furnace, referred to the poured volume of the contact material, as otherwise the gas circulation occurring through the reaction heat will not be sufficient to maintain an adequate velocity of reaction.

In the case of gas throughputs of more than 2 normal litres per gram of hydrogenating metal per hour, and especially when working with superatmospheric pressure it is advisable, in order to ensure controlled withdrawal of heat, no longer to employ the known concentrated contact material, containing, for example, 33% of cobalt metal, suitably spaced out, but to provide for uniform distribution of the metal in the form of a suitably diluted contact material e. g. by using more kieselguhr.

It is possible to employ contact materials which are highly dilute, for example containing only 2% by weight of cobalt. The low metal contents of the contact mass are particularly useful when low molecular hydrocarbons, from benzine down to gasol (propane and butane, propylene and butylene), are to be produced.

It is particularly advantageous to work with a pressure raised substantially above one atmosphere, for example kept at from 3 to 20 atmospheres. The pressure of 20 atmospheres represents in the first instance the upper limit for contact masses (such as cobalt, nickel and copper-containing contact materials) which facilitate the formation of water in accordance with the equation:

$$CO + 2H_2 = CH_2 + H_2O$$

since in this range of pressures the water of reaction condenses within the contact material at the reaction temperature, and then causes, on the one hand, direct obstructions of the reaction and, on the other hand, increased formation of side-reactions, for example the formation of acids. The pressure range of 20 atmospheres may, however, be exceeded if the reaction is carried out only incompletely at each passage through the furnace, or at a higher temperature as usual to get highest efficiencies so that the dew point of the water vapour is not reached within the reaction furnace. To this end it is possible to work with a plurality of reaction stages or with recycling of the gas, in which case conditions can easily be so regulated that the dew point of water vapour is not reached. Under these circumstances, it is also possible to employ pressures of up to 100 atmospheres, and more, in economical manner, and to attain very high gas throughputs and efficiencies.

For contact masses which facilitate the formation of carbon dioxide in accordance with the equation:

$$2CO + H_2 = CH_2 + CO_2$$

such as iron or iron-copper contact materials, there is no such pressure limit. With such contact materials it is true that products of increasingly higher molecular weight are formed with progressive increase of pressure, unless the increase in pressure is accompanied by an increase in throughput and possibly in temperature; but no pronounced obstruction of the reaction occurs.

When working according to the present invention, high yields, of for example 120 to 140 grams referred to an 84% synthesis gas, are then obtained despite the use of gas throughputs which are higher than 1 normal litre per hour and per gram of hydrogenating metal.

In addition, an unexpected lengthening of the life of the contact materials, and consequently a high permanent yield, are observed when working in accordance with the invention. For example, a contact material containing 12% of cobalt may be used for six months without substantial decline in yield.

A further advantage—particularly of contact masses which contain less than 33% by weight of hydrogenating metals—is the increased formation of benzine, when working in accordance with the invention, together with the suppression of the formation of paraffin. It is especially advantageous to keep the gas throughput or temperature so high, or the metal content of the catalyst so low, that no higher paraffin content within the catalyst is reached during reaction than 100%. Hitherto paraffin contents over 100% till 300%, even at normal pressure synthesis are normal. To this advantage must be added the more highly olefinic character of the products.

In principle, the throughput per gram of metal of hydrogenating action can be increased the more, the longer the time of stay and the lower the formation of paraffin are kept. For example, it is possible to work with advantage at a pressure of 100 atmospheres, with recycling of gas, with a contact mass containing only 5% of cobalt and an hourly throughput of gas of 10 normal litres per gram of cobalt.

A particularly long life of the contact masses is obtained, when working in accordance with the invention, if, by the return of reaction gases, the gas throughputs indicated, which relate to fresh gas supplied to the contact mass, are further raised. The formation of paraffin is greatly reduced by recycling when the temperature is suitably selected—and especially when it is increased as compared with optimum working conditions without recycling. This effect is further increased if the recycled quantity of reaction gas and the temperature are so selected that the hydrogen partial pressure of the gas entering the contact mass, at the pressure $p$ is smaller than $0.3 \times p^{0.9}$ atmospheres. In this way the deposition of solid paraffin on the active parts of the contact material is diminished and the decomposition products produced catalytically from this paraffin are reduced in quantity, so that the life of the contact material is further unexpectedly lengthened, for example to from 9 to 12 months. This favorable action on the life permits also working with gases which, on entering the contact mass, contain an excess of carbon monoxide over hydrogen beyond the proportion 1:2 in the case of cobalt contact materials, and over the proportion of 2:1 in the case of iron contacts, i. e. in general above the proportion of consumption of CO and $H_2$ by the catalyst employed. A large proportion of valuable olefinic hydrocarbons are then obtained, which are excellently suited for further chemical treatment, without having to purchase this advantage, as heretofore, at the cost of a shortened life. Without the method of working of the present invention, the life of the contact material is always unsatisfactory when excesses of carbon monoxide beyond the consumption proportion to hydrogen are used.

Of the two main measures of the present invention—namely the increasing of the gas throughput and lengthening of the time of stay, while retaining as far as possible the heat load calculated per square metre of the cooling elements—the first (the increasing of the gas throughput) is of advantage also from the standpoint of the plant costs, while the second (lengthening of the time of stay) involves expenditure, which means either expense for the enlarging of the contact furnace, or the incurring of expense for the compression of the gas. To what extent the methods possible in accordance with the invention will combine the two measures (increase of volume and increase of pressure) in detail, is a matter for calculation and consideration of other general questions of operation. If, for example, the cost of power is low and the cost of material high, it is less advisable to obtain the desired time of stay by means of larger contact furnace volumes, than by means of increased pressure, particularly as the yield is thereby generally raised.

Example I

A cobalt-thorium-kieselguhr catalyst of the composition:

| | Parts by weight |
|---|---|
| Cobalt | 100 |
| Thorium oxide | 18 |
| Kieselguhr | 182 |

(corresponding to 33% of cobalt, 6% of thorium oxide and 61% of kieselguhr), the production of which by precipitation from the nitrates and reduction of the carbonates has been described at the outset, is placed in granular form in a contact furnace in layers about 10 mm. in thickness separated by cooling elements preferably cooled by hot water. The contact chamber has a volume of 10 cubic metres available for the contact mass, and the contact filling amounts to three tons. The contact furnace is divided into two stages. Between the two stages a portion of the reaction products is withdrawn. 1000 cubic metres of synthesis gas (consisting, for example, of 28% of carbon monoxide, 56% of hydrogen and 16% of inert substances) are passed through the contact furnace at 180° C. and normal pressure, and a total yield of hydrocarbons of 100 grams per normal cubic metre of entry gas, consisting of 15% of paraffin, 40% of oil and 45% of benzine, is obtained. The time of stay of the gas in the contact chamber amounts to $10/1000 = 1/100$ hour $= 36$ seconds. The hourly gas throughput amounts to 1 normal cubic metre per kilogram of hydrogenating metal (cobalt) in the contact mass per hour. The paraffin content absorbed the contact mass accelerates gradually till 150% of original weight.

The heat load of the cooling surfaces is calculated in the following manner: The contact furnace contains 2000 square metres of cooling surface; of the quantity of $CO+2H_2$ contained in the entry gas $= 84/100$ of 1000 cubic metres $= 840$ cubic metres, there were still 40 cubic metres in the residual gas, together with the accumulated inert substances and gaseous reaction products, for example methane. Thus, 800 cubic metres were converted, which gave a heat generation of $800 \times 600 = 480,000$ kilogram calories. Referred to 1 square metre of cooling surface, this makes 240 kilogram calories per hour.

If the above indicated quantity of contact mass is accommodated in a furnace having a capacity of 20 cubic metres, for example by mixing the mass with the same volume of bulky substances, for example wire spirals, Raschig rings, pumice stone and the like, the same amount of contact material (3 tons) permits an hourly gas throughput of 1400 cubic metres, while retaining the yield of 100 grams per normal cubic metre (composition 14% of paraffin, 38% of oil and 48% of benzine).

The working temperature, i. e., the temperature of the cooling elements, is preferably kept a few degrees higher in this example, such as 185°. The time of stay of the gas, referred to the contact furnace space imagined as empty, amounts to 51.5 seconds, and the gas throughput to 1.4 normal cubic metres per kilogram of cobalt in the contact mass per hour. The heat load per square metre of cooling surface now amounts to 168 kilogram calories per hour.

Example II

Instead of spacing out the contact material with the aid of Raschig rings, pumice stone and the like, the process is carried out as in Example I, second paragraph, but with a contact mass to which about twice the amount of kieselguhr was added during its production. For example, a contact mass of the following composition is employed:

| | Parts by weight |
|---|---|
| Cobalt | 100 |
| Thorium oxide | 18 |
| Kieselguhr | 364 |

(21% of cobalt, 4% of thorium oxide, 75% of kieselguhr.)

The aforesaid contact furnace, having a capacity of 20 cubic metres, is filled with this contact mass, in such a way that the total content of cobalt now once again amounts to 1000 kilos, but now corresponds to 4.8 tons of contact mass. With a gas throughput of 1400 normal cubic metres, the time of stay once again amounts to 51.5 seconds, and the throughput per gram of cobalt per hour to 1.4 normal cubic metres. The yield in this case amounted to 110 grams of liquid hydrocarbons per normal cubic metre, consisting of 8% of paraffin, 35% of oil, 57% of benzine. Paraffin content of the layer used contact mass about 95%.

*Example III*

The capacity of the furnace was increased to 40 cubic metres and a contact composed of cobalt, thorium oxide and kieselguhr in the proportions: 100:18:728 was employed. At a temperature of 188° C. and a gas throughput of 1400 normal cubic metres per hour, 115 grams of liquid products consisting of 6% of paraffin, 30% of oil and 64% of benzine were produced. The time of stay amounts in this case to 103 seconds, and the gas throughput to 1.4 normal cubic metres per gram of cobalt per hour. Paraffin content of the layer used contact mass about 85%.

*Example IV*

As the enlarging of the furnace capacity beyond a certain degree becomes uneconomical, the enlargement of the furnace space is replaced, or accompanied by an increase in the working pressure, whereby the time of stay can be increased to a multiple.

For example, the operation is carried out with a contact material consisting of 100 parts of cobalt, 18 parts of thorium oxide and 364 parts of kieselguhr, a contact furnace having a capacity of 15 cubic metres, at a working pressure of 12 atmospheres, a working temperature of 195° C., and a gas throughput of 1500 normal cubic metres per hour. With 750 kilograms of cobalt in the contact chamber, the gas throughput amounts to 2.0 litres per gram of cobalt per hour, and the time of stay to 72 minutes. The yield then amounts to 130 grams of liquid products per normal cubic metre and consists of 20% of paraffin, 35% of oil, and 45% of benzine.

*Example V*

If the end gases produced by operating as in Example IV are recycled back to the contact chamber, in an amount equal to twice that of the fresh gas, the same yield is obtained at 200° C., but there is a lengthening of the life of the contact material from 4 to 9 months. In addition, considerably more benzine (64%) and less paraffin (6%) are produced with the yield indicated. Paraffin content of the contact mass after longer use about 60%.

In the case of gas throughputs over three litres per gram of cobalt per hour, for example 5 to 10 litres, and times of stay of the gas in the contact chamber below 8 minutes, the paraffin formation can be practically completely eliminated. Paraffin content in the contact mass below 50%.

With an excess of carbon monoxide in the gas entering the contact mass, beyond the proportion of the consumption of carbon monoxide and hydrogen, valuable highly olefinic benzines and oils are obtained, particularly when the gases are recycled.

*Example VI*

240 kgs. of a contact mass, containing 12 kgs. of cobalt, 2 kgs. of thorium oxide and 226 kgs. of kieselguhr, are charged in a contact chamber having a capacity of one cubic metre, with distances of 20 mm. between the cooling surfaces, at 220° C. and 100 atmospheres pressure, with 120 normal cubic metres of synthesis gas per hour. The reaction end gas is admixed with the fresh gas, after cooling in a heat exchanger and separation of the products then condensing. The amount of recycle gas amounts to 600 normal cubic metres per hour (at 100 atmospheres pressure).

A yield of 145 grams of liquid products—consisting predominantly of oil and benzine—is obtained per normal cubic metre, corresponding to a yield of 173 grams per normal cubic metre of originating gas excluding inert gases.

The gas throughput amounts in this example to 10 normal litres per gram of cobalt per hour. The time of stay amounts to 50 minutes, as the recycled quantity is not taken into account. The heat load is obtained as follows: Out of 120 normal cubic metres of entering gas, 98 cubic metres of $CO+2H_2$ are converted, which generate a quantity of heat of $98 \times 600 = 58,800$ kilogram calories. With a cooling surface in the contact furnace of 100 square metres, the heat load thus amounts to 588 kilogram calories per square metre per hour.

*Example VII*

The gas throughput in Example VI is trebled, and the recycle quantity quintupled. At 240° a yield of 140 grams of benzine and gasol hydrocarbons per normal cubic metre of originating gas is obtained. The heat load of the cooling surfaces now amounts to 1750 kilograms calories per square metre per hour, i. e. still less than the upper limit of the invention, of $$500 \sqrt[4]{p}\ 2320 \text{ kilogram calories per square metre per hour}$$

*Example VIII*

The gas throughput in Example VII is further doubled, and the furnace temperature is increased to 255° in order to retain the same relative gas conversion as in Example VII. Only 70 grams of benzine and gasol are still produced, the remaining products being predominantly methane and carbon dioxide. The heat load of the cooling surfaces amounts to 3600 kilogram calories per square metre per hour.

I claim:

1. In a process for the catalytic conversion of gaseous mixtures containing carbon monoxide and hydrogen into hydrocarbons with catalysts adapted to form benzine oil and paraffin under atmospheric pressure, said catalysts being arranged in a contact chamber adapted to maintain a desired reaction temperature therein, the steps comprising maintaining a temperature in said contact chamber above 150° C. but below the temperature required for the exclusive formation of methane with said catalysts, maintaining a velocity of the gas flow in contact with said catalysts above one normal litre per hour per gram of hydrogenating metal in said catalysts, and adjusting the pressure of the gas to a pressure above atmospheric and sufficient that the time the gases remain in contact with said catalysts is more than forty-five seconds.

2. In a process for the catalytic conversion of gaseous mixtures containing carbon monoxide and hydrogen into hydrocarbons with catalysts adapted to form benzine oil and paraffin under atmospheric pressure, said catalysts being arranged in a contact chamber adapted to maintain a desired reaction temperature therein, the steps comprising maintaining a temperature in said contact chamber above 150° C. but below the temperature required for the exclusive formation of methane with said catalysts, maintaining a velocity of the gas flow in contact with said catalysts two to twenty normal litres per hour per gram of hydrogenating metal in said catalysts, and adjusting the pressure of the gas to a pressure above atmospheric and sufficient that the time the gases remain in contact with said catalysts is one to ten minutes.

3. In a process for the catalytic conversion of gaseous mixtures containing carbon monoxide and hydrogen into hydrocarbons with catalysts adapted to form benzine oil and paraffin under atmospheric pressure, said catalysts being arranged in a contact chamber and provided with cooling members embedded therein adapted to maintain a desired reaction temperature in the contact chamber, the steps comprising maintaining a temperature in said contact chamber above 150° C. but below the temperature required for the exclusive formation of methane with said catalysts, maintaining a velocity of the gas flow in contact with said catalysts above one normal litre per hour per gram of hydrogenating metal in said catalysts, adjusting the pressure of the gas to a pressure above atmospheric and sufficient that the time the gases remain in contact with said catalysts is more than forty-five seconds and regulating the reaction temperature to such a degree that the generation of heat of the reaction, calculated as heat load, per square meter of cooling surface of cooling members embedded in the contact mass at the reaction gas pressure of $p$ atmospheres does not exceed the value of $$500 \sqrt[4]{p} \text{ kilogram calories per hour}$$

4. Process as claimed in claim 1, in which the space required by the catalyst is increased by disposing the contact grains in spaced out fashion, so as to increase the distance between the contact grains.

5. Process as claimed in claim 1, in which for the purpose of maintaining the required time of the contact with the gas, the pore volume of the catalyst is made large, by the employment of correspondingly voluminous carrier masses.

6. A process in accordance with claim 1, in which a catalyst mass is employed containing less than 33% by weight of hydrogenating metal carried by a voluminous carrier mass, said catalyst mass containing less than 100 grams of hydrogenating metal per litre of such mass.

7. A process in accordance with claim 1, in which a catalyst mass is employed containing less than 25% by weight of hydrogenating metal carried by a voluminous carrier mass, said catalyst mass containing less than 50 grams of hydrogenating metal per litre of such mass.

8. A process in accordance with claim 1, in which a catalyst mass is employed containing less than 25% by weight of hydrogenating metal carried by a voluminous carrier mass, said catalyst mass containing 10 to 4 grams of hydrogenating metal per litre of such mass.

9. Process as claimed in claim 1, in which when using catalyzers chiefly forming water in addition to hydrocarbons and applying pressures of 20 atmospheres and above and the reaction on a single passage of the synthesis gas through the catalyst is performed so incompletely that the dew point of water vapor is not reached within the contact chamber.

10. A process in accordance with claim 1, in which the proportion between the time the gas remains in contact with the catalyst, expressed in minutes, and the velocity of the gas flow, expressed in normal litres per gram of hydrogenating metal, is greater than 1:1.

11. A process in accordance with claim 1, in which the proportion between the time the gas remains in contact with the catalyst, expressed in minutes, and the velocity of the gas flow, expressed in normal litres per gram of hydrogenating metal, is at least 3:1 to 5:1.

12. Process as claimed in claim 1 in which the catalytic conversion is performed in a plurality of contact chambers connected in series.

13. A process in accordance with claim 1 in which the proportion between carbon monoxide and hydrogen in the gaseous mixture is more than 1:2.

14. A process in accordance with claim 1 in which the proportion of carbon monoxide in the gas with respect to the hydrogen therein is more than 1:2 and greater than the proportion which is caused to react with the hydrogen by the catalyst employed during the reaction.

15. Process as claimed in claim 1, in which the volume of the contact chamber is increased up to the quintuple of the loose volume of the contact material.

16. A process in accordance with claim 1, comprising in addition recycling the end gas of the reaction into said gaseous mixture and maintaining a reaction temperature above that producing optimum working conditions without recycling to maintain the formation of paraffin in the catalyst below 100% of the weight of the dry original catalyst.

17. In a process for the catalytic conversion of gaseous mixtures containing carbon monoxide and hydrogen into hydrocarbons with catalysts consisting of a hydrogenating metal, difficultly reducible metal compounds and a carrier mass, and adapted to form benzine oil and paraffin under atmospheric pressure, said catalysts being arranged in a contact chamber and provided with narrowly spaced cooling means embedded therein adapted to maintain a desired reaction temperature in the contact chamber, the steps comprising maintaining a temperature in said contact chamber above 150° C. but below the temperature required for the exclusive formation of methane with said catalysts, maintaining a velocity of the gas flow in contact with said catalysts above one normal litre per hour per gram of hydrogenating metal in said catalysts, and adjusting the pressure of the gas to a pressure above atmospheric and sufficient that the time the gases remain in contact with said catalysts is more than forty-five seconds.

18. A process in accordance with claim 1 in which the partial pressure of the hydrogen in said gaseous mixtures is maintained lower than $0.3 \times p^{0.9}$, $p$ designating the super-atmospheric pressure of said gaseous mixtures entering into the contact chamber.

WILHELM HERBERT.